United States Patent Office 3,634,278
Patented Jan. 11, 1972

3,634,278
MONOETHANOLAMINE-LITHIUM DECONTAMINATING AGENT
Billy C. Wolverton, Valparaiso, Fla., assignor to the United States of America as represented by the Secretary of the Air Force
No Drawing. Filed Feb. 20, 1969, Ser. No. 801,210
Int. Cl. A62d 3/00; B08b 3/08
U.S. Cl. 252—192          4 Claims

ABSTRACT OF THE DISCLOSURE

A chemical composition for efficiently countering the effects of chemical and biological warfare agents consisting of a mixture of monoethanolamine, hexylene glycol or other related solvents and a minor amount of either lithium hydroxide or metallic lithium.

BACKGROUND OF THE INVENTION

This invention relates to a decontaminating agent. More particularly, this invention concerns itself with an all purpose decontaminant that has been found effective in decontaminating both chemical and biological warfare agents.

The recent advances made in the formulation and utilization of chemical and biological warfare agents has further enhanced the problem of countering their effects through the use of conventional decontamination procedures. Many procedures have been tried in the past and, in general, involve two methods of approach, mechanical and chemical. Among the accepted mechanical methods are vacuum cleaning, blasting with abrasives, scraping, sanding, flame cleaning and surface removal. The primary chemical methods involve water washing, steam cleaning and scrubbing with detergents, acids, caustics, solvents and specially prepared chemical solutions. Because of the present-day chemical and biological agents, the use of specially prepared solutions has been found to be the most effective method of dealing with the decontamination problem. However, many of specially prepared decontaminants are hazardous to personnel because of their toxicity and damaging to materials because of their corrosiveness. In general, they are not simultaneously effective against both chemical and biological agents.

In attempting to overcome the problems which exist when using previously known decontaminating solutions, it has been found that the effects of both chemical and biological warfare agents can be effectively countered by utilizing the decontaminants of this invention. They are effective against both chemical and biological warfare agents; they possess a low toxicity; and are relatively noncorrosive.

SUMMARY OF THE INVENTION

In accordance with the teachings of this invention, the effective decontamination of chemical and biological warfare agents is accomplished by utilizing a decontaminating solution which contains monoethanolamine, hexylene glycol or other related solvents, and either lithium hydroxide or metallic lithium as a decontamination constitutent. The lithium component makes the formulation superior in its ability to decontaminate V agents, and other chemical warfare agents such as BZ, CS, HD and GB without contributing to an increase in the toxicity or corrosiveness of the basic decontaminating solution.

Accordingly, the primary object of this invention is to provide and efficient decontaminant for countering the effects of both chemical and biological warfare agents.

Another object of this invention is to provide a decontaminating solution that does not exhibit a high degree of toxicity or corrosiveness when employed with standard decontaminating techniques.

Still another object of this invention is to provide an effective decontaminating solution that can be employed to decontaminate aircraft, aircraft equipment, facilities such as buildings and runways, as well as personnel who have been contaminated by chemical and biological warfare agents.

The above and still further objects and advantages of this invention will become apparent upon consideration of the following detailed description thereof.

DESCRIPTION OF THE PREFERRED EMBODIMENT

Pursuant to the above objects of this invention, the present decontaminating solution comprises a mixture of about 50% to 75% monoethanolamine (MEA), 50% to 25% of hexylene glycol. (HG) or related solvent and about 0.5 to 1.0 molar of either lithium hydroxide or metallic lithium. The solutions are prepared by either dissolving $LiOH \cdot H_2O$ in water and then adding it to the monoethanolamine (MEA) base, or by directly dissolving $LiOH \cdot H_2O$ in the MEA base solution. The lithium metal was dissolved in monoethanolamine and then added to the MEA base.

These solutions have been found to be more effective in destroying VX agents than prior art decontaminants. The results obtained with stirred mixtures of these solutions and VX are summarized in Table I. The composition of these solutions, as well as those described hereinafter, is expressed in terms of the volume percentages of liquids in the solvent and the weight percentages of dissolved solids (on the w./v. basis).

Lithium metal, when dissolved in MEA, produced hydroegn gas and lithium aminoethoxide $$(LiO-CH_2CH_2-NH_2)$$

as a soluble product. It is assumed that this product persists when HG is added, although part of it might be converted to an alkoxide of HG.

TABLE 1.—DESTRUCTION OF VX BY LITHIUM BASES IN MEA-HG AND MEA HG-$H_2O$ SOLUTIONS [1]

| Solvent composition, percent [2] | | | Lithium base [3] | Volume ratio, VX to decon | Time of contact, minutes | Percent of VX remaining [4] |
|---|---|---|---|---|---|---|
| MEA | HG | $H_2O$ | | | | |
| 67 | 28 | 5 | 0.25 M LiOH | 1:20 | 30 | 17 |
|  |  |  |  |  | 180 | 6 |
|  |  |  |  |  | 240 | 4(F) |
| 67 | 28 | 5 | 0.25 M LiOH | 1:10 | 30 | 43 |
|  |  |  |  |  | 180 | 46 |
|  |  |  |  |  | 240 | 38(F) |
| 63 | 27 | 10 | 0.5 M LiOH | 1:10 | 15 | 12 |
|  |  |  |  |  | 60 | 6 |
|  |  |  |  |  | 240 | <1 |
|  |  |  |  |  | 240 | <1(F) |
| 63 | 27 | 10 | 0.5 M LiOH | 1:5 | 15 | 27 |
|  |  |  |  |  | 60 | 32 |
|  |  |  |  |  | 240 | 12 |
|  |  |  |  |  | 240 | 16(F) |
| 74.3 | 24.7 | 1.0 | 0.5 M LiOH | 1:10 | 5 | 11 |
|  |  |  |  |  | 15 | 1.5 |
|  |  |  |  |  | 30 | <1 |
|  |  |  |  |  | 60 | <0.4 |
|  |  |  |  |  | 240 | <0.1 |
| 74.3 | 24.7 | 1.0 | 0.5 M LiOH | 1:7.5 | 5 | 17 |
|  |  |  |  |  | 15 | 7 |
|  |  |  |  |  | 30 | 3 |
|  |  |  |  |  | 60 | 2 |
| 74.3 | 24.7 | 1.0 | 0.5 M LiOH | 1:5 | 5 | 30 |
|  |  |  |  |  | 30 | 10 |
|  |  |  |  |  | 240 | 10 |
| 74.3 | 24.7 | 1.0 | 0.5 M LiOH | 1:3 | 5 | 47 |
|  |  |  |  |  | 60 | 53 |
| 75 | 25 | 0 | 0.5 M LiAE | 1:10 | 15 | <1 |
|  |  |  |  |  | 20 | <1 |

[1] All mixtures were stirred magnetically and sampled at intervals.
[2] Volume percentages. A concentration of 1% water indicates that $LiOH \cdot H_2O$ was dissolved in a mixture of MEA and HG without the addition of liquid water.
[3] Either $LiOH \cdot H_2O$ or Li metal was dissolved in the solvent mixture.
[4] The analysis was by the anzymatic procedure unless the fluorimetric procedure is indicated by (F).

From the data in Table I it can be seen that the amount of VX that can be destroyed, if adequate time is allowed, is stoichiometrically related to the amount of lithium base present. As discussed later, it is reasonable to expect that the stoichiometric ratio of VX destroyed to lithium base originally added would be 1:1 on a molar basis. Assuming unit density for VX, this ratio means that the maximum relative volume of VX that could be completely destroyed by 0.5 M lithium base would be about 1:7.5, or by 0.25 M(M=molar) lithium base, about 1:15. Generally speaking, the results are consistent with this prediction.

The rate of the destruction of VX by LiOH solutions increases as the amount of water in the solution is reduced. With onyl 1% of water present in a 0.5 M LiOH solution, a 10:1 volume ratio of the decontaminating solution to VX essentially destroys the VX completely in 15 minutes. This rate is about the same with a solution of 0.5 M lithium aminoethoxide (LiAE), in which water was present only if it was added inadvertently as an impurity. A possible explanation for the effect of water on the reaction rate is discussed later.

Results from examples in which the test solutions were static, rather than stirred, were also obtained. One example involved a 1:10 mixture of VX with 0.5 M LiOH in 63% MEA-27% HF-10% water. Percentages of the initial amount of VX found by enzymatic analysis were as follows: 5 minutes, 25%; 15 minutes, 15%; 30 minutes, 8%. These results indicated that the disappearance of VX was somewhat slower than in the comparable examples of Table I where the mixtures were stirred. The stirred mixtures probably had a slightly higher temperature, as a result of heating from the magnetic stirrer, and thus a faster reaction rate.

In additional test results, the time-consuming enzymatic analyses were omitted, and data to indicate the rates and degrees of VX destruction were observed by another method. Two-milliliter quantities of varying ratios of VX and decontaminating solution were mixed in small tubes that were rotated end-over-end for 5 minutes and then added to a mixture of 10 ml. of water and 10 ml. of cyclohexane; aliquots of the cyclohexane phase were removed and allowed to dry by evaporation. The oily residues were weighed to determine the relative amounts of VX that were not destroyed by the decontaminating solution and thus were recovered by extraction with the water-cyclohexane system. The decontaminating solutions contained 0.5 M LiOH and varying percentages of water (10, 1, or 0%), or 0.5 M LiAE in a water-free system. In order to obtain a water-free solution, anhydrous LiOH rather than the hydrate, $LiOH \cdot H_2O$, was dissolved in a mixture of MEA and HG. The results of these tests are summarized in Table II. Within experimental error, the same amount of VX remained after 5 minutes in a decontaminating solution that was prepared to contain 0.5 M LiOH and 1% of water, 0.5 M LiOH and no water, or 0.5 M LiAE and no water; on the other hand, a much greater amount of VX remained after 5 minutes in a decontaminating solution that was prepared to contain 0.5 M LiOH and 10% water.

TABLE II.—DESTRUCTION OF VX BY LITHIUM BASES IN MEA-HG AND MEA-HG-$H_2O$ SOLUTIONS [1]

| Solvent composition,[2] percent | | | | Volume ratio, VX to decon | Apparent percent of VX remaining [3] |
| --- | --- | --- | --- | --- | --- |
| MEA | HG | $H_2O$ | Lithium base | | |
| 75 | 25 | 0 | 0.5 M LiAE [4] | 1:19 | 3 |
| | | | | 1:9 | 11 |
| 75 | 25 | 0 | 0.5 M LiOH [5] | 1:19 | 2 |
| | | | | 1:9 | 6 |
| 74.3 | 24.7 | 1.0 | 0.5 M LiOH [6] | 1:19 | 0 |
| | | | | 1:9 | 10 |
| 63 | 27 | 10 | 0.5 M LiOH [7] | 1:19 | 46 |
| | | | | 1:9 | 39 |

[1] Contact time of VX in each solution was 5 minutes.
[2] Volume percentages.
[3] Based on weight of extract in cyclohexane.
[4] Li metal was dissolved in MEA-HG.
[5] LiOH was dissolved in MEA-HG.
[6] $LiOH \cdot H_2O$ was dissolved in MEA-HG.
[7] $LiOH \cdot H_2O$ was dissolved in water and added to MEA-HG.

From a theoretical standpoint, it is reasonable to assume that an MEA-base decontaminating solution containing hydroxide destroys VX by reaction (1)

$$\begin{array}{c}O\\ \diagdown \nearrow \\ P \\ \diagup \diagdown \\ S-R\end{array} + HO-CH_2CH_2-NH_2 + OH^- \longrightarrow$$

$$\begin{array}{c}O\\ \diagdown \nearrow \\ P \\ \diagup \diagdown \\ O^-\end{array} + HO-CH_2CH_2-NH_3^+ \quad (1)$$

and that an MEA-base decontaminating solution containing aminoethoxide destroys VX by reaction (2)

$$\begin{array}{c}O\\ \diagdown \nearrow \\ P \\ \diagup \diagdown \\ S-R\end{array} + {}^-O-CH_2CH_2-NH_2 \longrightarrow$$

$$\begin{array}{c}O\\ \diagdown \nearrow \\ P \\ \diagup \diagdown \\ OCH_2CH_2NH_2\end{array} + RS^- \quad (2)$$

In both reactions, one mole of lithium base is required for each mole of VX destroyed.

In order to explain the results obtained with the present invention, it is also helpful to postulate that an equilibrium exists between hydroxide and aminoethoxide ions, as shown by reaction (3)

$$OH^- + HO-CH_2CH_2-NH_2 = H_2O + {}^-O-CH_2CH_2-NH_2 \quad (3)$$

A similar equilibrium exists between hydroxide and ethoxide, in a solution prepared by dissolving an alkali hydroxide in ethanol, as shown by reaction (4)

$$OH^- + CH_3CH_2OH = H_2O + CH_3CH_2-O^- \quad (4)$$

The equilibrium constant for (4) is such that with 1% of water present, the existence of ethoxide rather than of hydroxide is favored (E. F. Caldin & G. Long, J. Chem. Soc. 1954, 3737). If the equilibrium constant for (3) is similar in magnitude, solutions prepared by dissolving LiOH in MEA-base solvents, with only a small amount of water present, would contain principally aminoethoxide rather than hydroxide. Therefore, we assume that the increasing rate of VX destruction by LiOH solutions that is observed as the percentage of water decreases from 10% to 1% may be attributed to a shift in equilibrium (3) to favor aminoethoxide, which destroys VX more rapidly by reaction (2) than hydroxide does by reaction (1). Practically speaking, there may be no significant difference in the compositions of solutions prepared by dissolving equivalent amounts of $LiOH \cdot H_2O$, LiOH, or Li metal in a mixture of MEA and HG.

The above test results show that strong lithium bases, especially the aminoethoxide, are favorable to the rapid destruction of VX. Additional test results on their effect on HD agent are presented in Table III. Mixtures of HD and the decontaminating solutions were prepared and allowed to stand at room temperature for varying intervals. The amount of HD that remained was determined by diluting with water, extracting with heptane, and analyzing the heptane phase by gas chromatography.

TABLE III.—DESTRUCTION OF HD BY LITHIUM BASES IN MEA-HG SOLUTIONS

| Solvent composition [1] | Lithium base | Volume ratio, HD to decon | Time of contact, minute | Percent of HD remaining [2] |
| --- | --- | --- | --- | --- |
| 75 percent MEA | 0.5 M LiOH [3] | 1:10 | 15 | 60 |
| | | | 30 | 52 |
| | | | 60 | 50 |
| Do | 0.5 M LiOH [3] | 1:26 | 15 | 11 |
| | | | 30 | 5 |
| | | | 60 | 2 |
| Do | 0.5 M LiAE [4] | 1:26 | 15 | 23 |
| | | | 30 | 12 |
| | | | 60 | 7 |

[1] Volume percentages.
[2] Determined by a gas chromatographic procedure.
[3] Anhydrous LiOH was dissolved in the solvent.
[4] Li metal was dissolved in MEA and diluted in a mixture of MEA and HG.

The results which are summarized in Table III indicate that 0.5 M LiOH or 0.5 M LiAE in water-free MEA-HG mixtures (in these mixtures, either base presumably exists mainly as aminoethoxide) can destroy HD, provided the volume ratio of decontaminating solution to HD exceeds 26:1. This ratio suggests that the mole ratio of lithium base to HD should be 2:1 or greater to produce optimum results.

Additional test results showing the effects of the solutions of this invention are provided in Table IV while Table V discloses results obtained by using various modification of the basic solution of this invention.

TABLE IV

| Percent | | | Volume ratio agent to decon | Agent | Percent of agent or No. of bacteria remaining | Contact time, minutes |
|---|---|---|---|---|---|---|
| MEA | HG | LiOH | | | | |
| 68 | 32 | 0 | 1:5 | GB | .01 | 5 |
| 75 | 25 | 0.5 M | 1:9 | VX | 6 | 5 |
| 75 | 25 | 0.5 M | 1:26 | HD | 10 | 15 |
| 67 | 33 | 0 | 1:9 | (1) | 0 | 1 |

[1] $S.\ marcescens$ 1×10⁷ cells/ml.

Modifications of the preferred solutions of this invention included the addition of a solid freezing-point depressant, potassium acetate (KOAc), and changes in the solvent constituents. One change in composition that was included in all of the modifications was the use of $LiOH \cdot H_2O$ as a substitute for anhydrous LiOH: this substitution is desirable because of the lower cost of $LiOH \cdot H_2O$. The concentration of $LiOH \cdot H_2O$ was approximately the maximum amount soluble in each liquid mixture.

The properties of the solution that were studied were freezing point, chemical effects on VX and HD, flash point, and viscosity. The latter two properties were included, since one modified formulation investigated earlier had a flash point that was too low, and the MEA-HG-LiOH solution mentioned above has viscosity values that might interfere with its application. The data for both the MEA-HG-LiOH solution and the various solutions of modified compositions are summarized in Table V.

The purpose for utilizing KOAc as a freezing-point depressant in MEA-containing solutions is to improve its utility at low temperatures. Preliminary results indicated that saturation of the previously described MEA-HG-LiOH solution with KOAc would not sufficiently depress the freezing point. Further work showed, however, that a slight modification of the solvent composition, from 75% of MEA and 25% of HG to 70% of MEA and 30% of HG, and the addition of 3.0% of $LiOH \cdot H_2O$ and 7.0% of KOAc (approximately the maximum concentrations allowed by solubilities) provides a solution having a freezing point of −24° C. This solution was found to be somewhat slower in destroying VX and HD than the original solution. However, the change in composition increased the flash point slightly by 3° C. and made a highly desirable reduction in viscosity at 0° C., from 625 to 354 centistokes, as expressed in kinematic units.

KOAc is of value only in changing the physical properties of the decontaminating solution. It is a weaker base than either MEA or LiOH and does not act as an effective decontaminant. A solution consisting of MEA, HG, and KOAc (with LiOH omitted) was found to have little, if any, chemical effect on VX, as expected.

A substantial increase in the percentage of HG would be expected to lower the freezing point even if KOAc were not added. It was estimated that the solvent composition would have to be approximately 50% of MEA and 50% of HG if the freezing point were to be as low as −25° C., as desired. A liquid mixture of this composition was tested and 3.0% of $LiOH \cdot H_2O$ was dissolved in it. The observed freezing point was −24° C., but the effec-

TABLE V.—COMPOSITION AND PROPERTIES OF DECONTAMINATING SOLUTIONS

| Concentrations of liquid components, percent [1] | | | | | | Concentrations of solid components, percent [2] | | Freezing point, °C. | Flash point, °C. | Kinematic viscosity [3], centistokes at— | | Destruction of toxic agents | | | | | | |
|---|---|---|---|---|---|---|---|---|---|---|---|---|---|---|---|---|---|---|
| MEA | HG | MIPA | PGME | DPGME | | LiOH | LiOH·H₂O | KOAc | | | 0° C. | 25° C. | Reaction temperature, °C. | VX remaining, percent, after—[4] | | | HD remaining, percent, after—[5] | | |
| | | | | | | | | | | | | | | 2 min. | 5 min. | 15 min. | 30 min. | 5 min. | 15 min. | 30 min. |
| 75 | 25 | | | | | 2.2 | | | −3 | 93 | 625 | 74 | 0 / 25 | | 14 / 0.4 | 13 / 0.4 | 11 / 0.1 | 80 / 36 | 73 / 11 | 67 / 2 |
| 70 | 30 | | | | | | 3.0 | 7.0 | −24 | 96 | 354 | 75 | 0 / 25 | 1 | 33 | 32 | 30 | 85 / 85 | 79 / 28 | 72 / 11 |
| 50 | | | | | | | 3.0 | | −24 | 43 | 74 | 17 | 0 / 25 | 15 | 4 / 54 | 28 / 2 | 0.5 / 21 | 44 | | |
| 48 | | 52 | | | | | 3.0 | | −32 | 82 | 95 | 19 | 0 / 25 | 28 | 13 / 37 | 7 / 28 | 3 / 20 | 75 | 55 | 35 |
| 37 | | | 63 | | | | 3.0 | | −30 | | | | 0 / 25 | 30 | 21 / 36 | 28 / 6 | 4 / 8 | | | |
| 55 | 45 | | | | | | 3.6 | | −40 | 85 | 239 | 46 | 0 / 25 | 31 / 44 / 15 | 17 / 30 / 3 | 15 / 0.3 | 0.1 | 86 / 77 / 36 | 77 / 71 / 17 | 52 / 62 / 10 |

[1] Expressed in percentages by volume. MEA=monoethanolamine; HG=hexylene glycol; MIPA=monoisopropanolamine; PGME=propylene glycol monomethyl ether; DPGME=dipropylene glycol monomethyl ether.
[2] Expressed in percentages by weight.
[3] Values are given in kinematic viscosity units, since density values necessary to compute absolute viscosities (in centipoises) were not available.
[4] The volume ratio of decontaminating solution to VX was 1:10.
[5] The volume ratio of decontaminating solution to HD was 1:20.

tiveness of this solution for the destruction of VX was found to be less than that of the MEA-HG-LiOH·H₂O-KOAc solution with the same freezing point and even less than that of the original MEA-HG-LiOH solution.

Another modification of the preferred solution of this invention involves the substitution of the monomethyl ethers of propylene glycol and dipropylene glycol (PGME and DPGME, respectively); these compounds have low freezing points, good solvent properties, and low toxicities by both vapor inhalation and skin contact.

The freezing points of a series of MEA-PGME and MEA-DPGME solutions were determined. The data indicated that the minimum percentages of PGME and DPGME that would be required to produce freezing points near −25° C. would be 50% and 60% respectively; substantially higher percentages of these components were expected to make undesirable reductions in decontaminating activity. Thus, two decontaminating solutions were prepared from liquid mixtures of the following compositions: 48% of MEA and 52% of PGME, and 37% and of MEA and 63% of DPGME. Each contained 3.0% of LiOH·H₂O.

Both solutions were found to freeze near −30° C. Both solutions were found to exhibit about the same effectiveness for the destruction of VX and HD, but both were much less effective than the original MEA-HG-LiOH solution, especially with HD. The flash points were found to be 43° C. for the MEA-PGME-LiOH·H₂O solution and 82° C. for the MEA-DPGME-LiOH·H₂O solution. The flash point of the solution containing PGME, much lower than that of the MEA-HG-LiOH solution (93° C.), is considered to be somewhat undesirable; the flash point of the solution containing DPGME, on the other hand, is considered to be satisfactory. Both solutions had lower viscosities than the MEA-HG-LiOH solution, as desired; however, the advantages in viscosities cannot be regarded as sufficient to offset their somewhat unfavorable decontaminating activities.

Monoisopropanolamine (MIPA) can also be substituted for HG. This compound appears to have a low vapor toxicity and freezing-point data for MEA-MIPA mixtures indicate that the percentage of MIPA would have to be near 50% to produce a freezing point of −25° C. or lower. However, MIPA is chemically similar to MEA and acts as a decontaminant as MEA does; thus, a high percentage of MIPA does not seriously affect the rate of decontamination, whereas high percentages of inert liquids, such as HG, PGME, and DPGME, will have serious effects.

A solution containing 3.6% of LiOH·H₂O in a liquid mixture of 55% and 45% MIPA was prepared in the same manner as the other solutions of this invention and evaluated. The test results showed that this formulation offered two improvements over the original MEA-HG-LiOH solution: the new formulation freezes at least 40° C. lower, and it has lower viscosities at both 0° C. and 25° C. It also has an acceptable flash point, and it destroys HD at about the same rate as the MEA-HG-LiOH solution. On the other hand, the modified solution is somewhat less effective for VX; it is similar in effectiveness to the MEA-HG-LiOH·H₂O-KOAc solution discussed previously but more effective than the other experimental solutions.

The evaluation of two decontaminating solutions—one consisting of 3.6% of LiOH·H₂O in a mixture of 55% of monoethanolamine (MEA) and 45% of monoisopropanolamine (MIPA), and the other consisting of 3.0% of LiOH·H₂O and 7.0% of potassium acetate (KOAc) in a mixture of 70% of MEA and 30% of hexylene glycol (HG) are presented in Tables VI, VII and VIII. The evaluations consisted of determining the effects on two toxic chemical agents, GB and BZ, and two simulants of toxic biological agents, *Bacillus circulans* and *Serratia marcescens*; the effects on selected metals and nonmetals; the toxicity of volatile components to mice; the densities at 0° C. and 27° C. and the boiling points.

The rates of destruction of GB in stirred mixtures with each decontaminating solution at 0° C. and 25° C. were determined by enzymatic analyses. The volume ratio of the agent to the decontaminating solution was 1:5 in each test. The test results, summarized in Table VI, indicate that both decontaminating solutions are highly effective for destroying GB. The MEA-MIPA-LiOH·H₂O solution appeared to destroy GB somewhat faster at both temperatures than MEA-HG-LiOH·H₂O-KOAc solution; however, each solution destroyed 99.9% or more of the GB at both temperatures with only 15 min. of contact.

TABLE VI.—DESTRUCTION OF GB BY THE DECONTAMINATING SOLUTIONS [1]

| Decontaminating solution | Temperature, °C. | GB remaining after— | | Percent after 15 min. |
|---|---|---|---|---|
| | | 2 min. | 5 min. | |
| MEA-MIPA-LiOH·H₂O | 25 | 0.1 | 0.1 | |
| | 0 | 3 | 0.2 | 0.1 |
| MEA-HG-LiOH·H₂O-KOAc | 25 | 0.2 | 0.1 | 0.1 |
| | 0 | 7 | 0.5 | 0.1 |

[1] The volume ratio of GB to the decontaminating solution was 1:5.

The destruction of BZ at 25° C. was observed in experiments based on infrared analyses. Approximately 0.1 g. of BZ was stirred with 2 ml. of each decontaminating solution for a period of about 30 minutes during which the BZ appeared to dissolve completely. One part by volume of the solution thus obtained was then diluted with nine parts by volume of chloroform, and the infrared spectrum of the final solution in a 0.5-mm. cell was recorded. The carbonyl absorption band that is characteristic of BZ was not observed in the infrared spectrum. The sensitivity of the infrared analysis would have permitted detection of BZ at a concentration of only 0.05 g./ml. Since the concentration of BZ would have been 0.5 g./ml. if no reaction had occurred, at least 90% of the BZ had been destroyed by reaction.

The effects of the decontaminating solutions on toxic biological agents are shown by test results with *Serratia marcescens* and *Bacillus circulans*. Broth cultures of the organisms (grown in Tryptic soy broth) were collected and washed by centrifugation and suspended in physiological saline (0.85% NaCl). Tubes containing 9.9 ml. of each of the decontaminating solutions of Table VI either at full strength or at 70% of full strength after dilution with water, were inoculated at 25° C. with 0.1-ml. portions of the bacterial suspensions. Samples were removed immediately after inoculation and at 1-minute and 5-minute intervals thereafter. These samples were diluted with physiological saline in 10-fold serial dilutions and plated in Tryptic soy agar. The plates were incubated for 24 hours at 37° C., and then the colonies of bacteria were counted to determine how well the organisms survived the exposures to the decontaminating solutions.

The test results indicated that the *Serratia marcescens* bacteria were rapidly and completely killed by both decontaminating solutions at full strength and at 70% of full strength. No growth was observed in any of the cultures prepared from four serial dilutions.

The test results with *Bacillus circulans*, on the other hand, appear to show that neither decontaminating solution effectively killed these spore-forming bacteria, whether used at full strength or at 70% of full strength. Cultures from the first serial dilution showed no growth, regardless of the time of contact with the decontaminating solution; however cultures from the second serial dilution showed uninhibited growth. The lack of growth after the first dilution was attributed to inhibition by the concentration of the decontaminating solution that was present, not to the absence of viable cells.

The corrosive effects of the decontaminating solutions on various metals were evaluated and shown by determining the losses in weight of metal specimens during total immersion. The specimens were 1 x 4-inch panels from sheets about 50 mils thick. Each panel was immersed at 25° C. for 15 days. The losses in weights of the various specimens, listed in Table VII show that the three types of aluminum were the most severely attacked. Relatively minor changes in brass, copper, the magnesium alloy, and steel 1020 were observed; with no changes in the titanium alloy, stainless steel 301, or Unitemp 1753. The weight losses of the aluminum materials were markedly greater in the MEA-HG-LiOH·H₂O-KOAc solution than in the MEA-MIPA-LiOH·H₂O solution.

TABLE VII.—CORROSION OF METALS IN THE DECONTAMINATING SOLUTIONS AT 25° C. FOR 15 DAYS

| | Weight loss, mg [1], of 1 x 4-in. panel immersed in— | |
|---|---|---|
| | MEA-MIPA-LiOH·H₂O solution | MEA-HG-LiOH·H₂O-KOAc solution |
| Type of metal: | | |
| Brass [2] | 2 | 1 |
| Copper [3] | 1 | 0 |
| Aluminum 1100 | 29 | 52 |
| Aluminum 2024 | 13 | 48 |
| Aluminum Clad 7075 | 25 | 41 |
| Magnesium alloy HK 31A | 5 | 4 |
| Titanium alloy Ti-6Al-4V | 0 | 0 |
| Stainless steel 301 | 0 | 0 |
| Steel 1020 | 6 | 6 |
| Unitemp 1753 | 0 | 0 |

[1] Average for 4 specimens.
[2] Muntz metal (60% copper, 40% zinc).
[3] Purity, 99.9%.

The effects of the decontaminating solutions on four types of nonmetallic materials—wool fabric, butyl rubber sheeting, Plexiglas, and enamel paint on wood or metal—were observed by visual inspection after 24 hours of immersion at room temperature. Both solutions caused weakening and discoloration of the wool and partial detachment and discoloration of the enamel paint. Neither had any discernible effect on the Plexiglas or the rubber sheeting.

The toxicities of vapors from the two decontaminating solutions of Table VI were determined by exposing two groups of five female Swiss mice and two groups of five male Swiss mice to the vapors for 24-hour periods. In each exposure, five mice were placed in a desiccator and supplied with air containing the vapors from one of the solutions. Approximately 50 ml. of the solution was stirred in a container at room temperature, and the air was swept at 1 l./min., first over the surface of the solution and then through the desiccator where the mice were confined. None of the animals died during the 24-hour period of exposure. Furthermore, none died during a 3- or 4-day subsequent period of observation under normal environmental conditions.

Test results showing the densities and boiling points of the two solutions of Table VI are listed in Table VIII.

TABLE VIII.—DENSITIES AND BOILING POINTS OF THE DECONTAMINATING SOLUTIONS

| Decontaminating solution | Density, 0° C. | G./ml., 27° C. | Boiling point, ° C. |
|---|---|---|---|
| MEA-MIPA-LiOH·H₂O | 1.024 | 1.003 | 148-149 |
| MEA-HG-LiOH·H₂O-KOAc | 1.048 | 1.025 | 158-160 |

The data presented herein indicates that either the MEA-MIPA-LiOH·H₂O solutions or the MEA-HG-LiOH·H₂O solutions of this invention are satisfactory decontaminants for chemical warfare agents such GB, VX, HD and BZ and biological warfare agents, except the spore-forming varieties.

Although the formulations from Table VI appear to attack aluminum materials more rapidly than the other formulations, it does not appear that the maximum rate of attack observed is too high to be accepted; the maximum weight loss of an aluminum material listed in Table VII, 52 mg in 15 days for a 1 x 4-inch specimen, corresponds to an average penetration on one surface of only 0.0004 cm. It becomes apparent, therefore, that the present invention provides an effective solution for countering the effects of chemical and biological warfare agents. The decontaminating solutions prepared in accordance with the concepts of this invention and containing a strong lithium base, such as the hydroxide or the aminoethoxide dissolved in a binary MEA solvent solution, are most effective against chemical warfare agents such as VX, GB, HD and toxic biological warfare agents such as non-spore forming bacteria.

The invention has been described with particular reference to specific embodiments thereof. It is to be understood however that the description of the present invention is for the purpose of illustration only, and it is not intended to limit the invention in any way.

What is claimed is:

1. A solution for the effective decontamination of chemical and biological warfare agents consisting essentially of a mixture of a binary solution of monoethanolamine and a solvent selected from the group consisting of hexylene glycol, monoisopropanolamine, propylene glycol monomethyl ether and dipropylene glycol monomethyl ether. together with a minor amount of a lithium base material selected from the group consisting of lithium hydroxide and metallic lithium wherein said monoethanolamine and said solvent are present in a ratio range of from about 35:65 to about 75:25 and said lithium base material is present in molar amounts of about 0.5 to 1.0 M.

2. A solution in accordance with claim 1 including a freezing point depressant.

3. A solution for the effective decontamination of chemical and biological warfare agents comprising a mixture of about 75 percent by volume monoethanolamine, 25 percent by volume hexylene glycol together with lithium hydroxide present in molar amounts of about 0.5 M.

4. A solution for the effective decontamination of chemical and biological warfare agents comprising a mixture of about 75 percent by volume monoethanolamine, 25 percent by volume hexylene glycol together with metallic lithium present in molar amounts of about 0.5 M.

References Cited

UNITED STATES PATENTS

| 2,718,454 | 9/1955 | Wylie | 252—192 |
| 3,079,346 | 2/1963 | Jackson | 252—158 |
| 3,080,262 | 3/1963 | Newman | 252—156 |

RICHARD D. LOVERING, Primary Examiner

I. GLUCK, Assistant Examiner

U.S. Cl. X.R.

23—2 A; 134—2, 29; 210—59, 64; 252—158, 424—127, 325